(12) United States Patent
Xi

(10) Patent No.: US 8,880,969 B2
(45) Date of Patent: Nov. 4, 2014

(54) SWITCHING CONVERTER WITH PULSE SKIPPING MODE AND CONTROL METHOD THEREOF

(75) Inventor: Xiaoyu Xi, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 227 days.

(21) Appl. No.: 13/413,906

(22) Filed: Mar. 7, 2012

(65) Prior Publication Data

US 2013/0173980 A1    Jul. 4, 2013

(30) Foreign Application Priority Data

Dec. 28, 2011  (CN) .......................... 2011 1 0446369

(51) Int. Cl.
*G06F 11/07* (2006.01)
*G06F 11/36* (2006.01)

(52) U.S. Cl.
USPC .......................................... 714/746; 714/734

(58) Field of Classification Search
None
See application file for complete search history.

(56) References Cited

U.S. PATENT DOCUMENTS

| | | | |
|---|---|---|---|
| 5,949,296 A * | 9/1999 | Jacobson ...................... | 332/152 |
| 6,510,066 B2 * | 1/2003 | Giannopoulos et al. ........ | 363/97 |
| 2006/0061343 A1 * | 3/2006 | Lipcsei et al. ................ | 323/283 |
| 2011/0084677 A1 | 4/2011 | Shi et al. | |

* cited by examiner

*Primary Examiner* — Ajay Bhatia
*Assistant Examiner* — Dipakkumar Gandhi
(74) *Attorney, Agent, or Firm* — Perkins Coie LLP

(57) ABSTRACT

The present invention provides a switching converter with pulse skipping mode. The switching converter comprises a switching circuit having at least one switch, a controller and a feedback circuit. The controller comprises an error amplifying circuit, a logic circuit, a ramp signal generator and a pulse skipping circuit. The error amplifying circuit generates a compensation signal based on comparing the feedback signal with a reference signal. The logic circuit generates a control signal to control the ON and OFF switching of the at least one switch based on the compensation signal. The ramp signal generator generates a ramp signal. The pulse skipping circuit generates a pulse skipping signal based on the compensation signal, the ramp signal and a threshold voltage. The logic circuit skips one or more switching pulses of the control signal in accordance with the pulse skipping signal.

16 Claims, 6 Drawing Sheets

SWITCHING CONVERTER WITH PULSE SKIPPING MODE AND CONTROL METHOD THEREOF

CROSS-REFERENCE TO RELATED APPLICATION(S)

This application claims the benefit of CN application 201110446369.1, filed on Dec. 28, 2011, and incorporated herein by reference.

TECHNICAL FIELD

Embodiments of the present invention generally relate to electronic circuits, and more particularly, relate to switching converters with pulse skipping mode and control methods thereof.

BACKGROUND

Nowadays, the energy efficiency and the environment protection become more and more important. The expectation of the standby efficiency of a power supply is also increased. The power supplies are requested to satisfy many green energy standards, such as BLUE ANGEL, ENGERY STAR, ENERGY 2000, etc. As a result, a pulse skipping mode is generated to enhance the standby efficiency. During the pulse skipping mode, some switching pulses are skipped to reduce the switching loss while the regulation of the output voltage is maintained.

Generally, a feedback signal representative of the output voltage of the power supply is compared with a reference signal by an error amplifier, so as to generate a compensation signal. The compensation signal is compared with a constant threshold voltage hysteretically. When the compensation signal is smaller than the constant threshold voltage, one or more switching pulses of the control signal are skipped to keep the switch off until the compensation signal becomes larger than the constant threshold voltage. Ideally, during the pulse skipping mode, there is only one switching pulse at a time. The time period between two adjacent switching pulses is determined by the load. The lighter the load, the longer the time period, and vice versa.

However, under the influence of the output filter and the error amplifier, the power supply usually needs two or more switching pulses to reduce the compensation signal to be smaller than the constant threshold voltage. The efficiency and stability of the power supply is limited, and the ripple of the output voltage is large.

SUMMARY

The present invention is directed to a switching converter with pulse skipping mode. The switching converter comprises a switching circuit, a controller and a feedback circuit. The switching circuit comprises at least one switch and converts an input voltage into an output voltage through the ON and OFF switching of the at least switch. The feedback circuit is coupled to the output terminal of the switching circuit and generates a feedback signal representative of the output voltage.

The controller comprises an error amplifying circuit, a logic circuit, a ramp signal generator and a pulse skipping circuit. The error amplifying circuit is coupled to the feedback circuit and generates a compensation signal based on comparing the feedback signal with a reference signal. The logic circuit is coupled to the switching circuit and the error amplifying circuit. The logic circuit generates a control signal having periodical switching pulses based on the compensation signal to control the ON and OFF switching of the at least one switch. The ramp signal generator generates a ramp signal. The pulse skipping circuit is coupled to the error amplifying circuit and the ramp signal generator, and generates a pulse skipping signal based on the compensation signal, the ramp signal and a threshold voltage. The logic circuit receives the pulse skipping signal and skips one or more switching pulses of the control signal in accordance with the pulse skipping signal.

In one embodiment, the ramp signal is a triangular signal which is increased or decreased in accordance with the polarity of the control signal. In one embodiment, the ramp signal is gained from the control signal through a resistor capacitor network.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
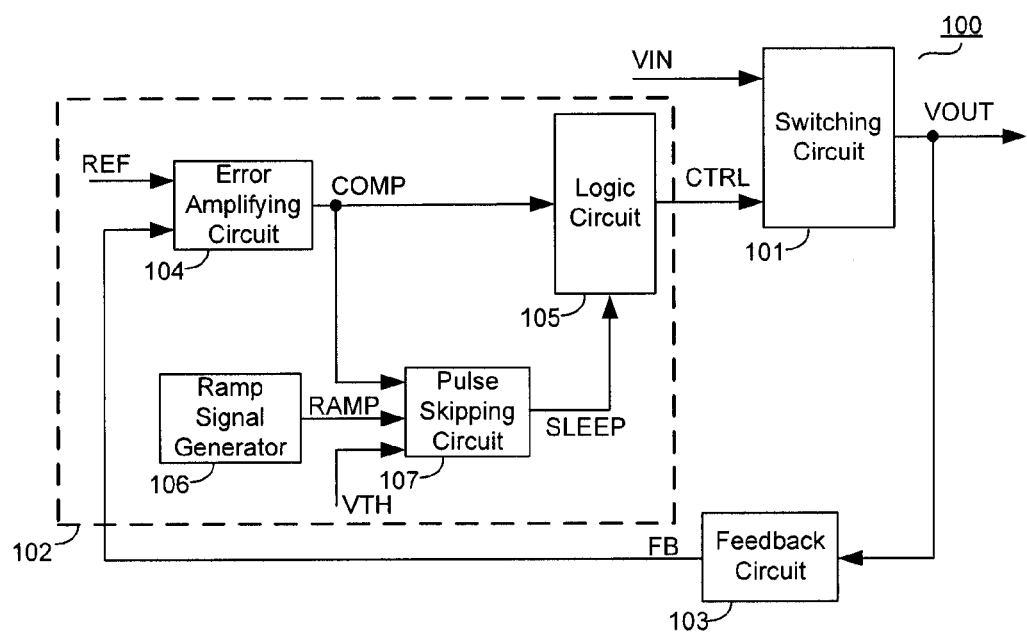
FIG. 1 is a block diagram of a switching converter 100 in accordance with an embodiment of the present disclosure.

FIG. 1 is a block diagram of a switching converter 100 in accordance with an embodiment of the present disclosure. The switching converter 100 comprises a switching circuit 101, a controller 102 and a feedback circuit 103. The switching circuit 101 comprises at least one switch. The switching converter 101 converts an input voltage VIN into an output voltage VOUT through the ON and OFF switching of the at least switch. The switching converter 101 may be configured in any DC/DC or AC/DC topology, such as buck converter, boost converter, flyback converter and so on. The switches in the switching circuit 101 may be any controllable semiconductor device, such as MOSFET (metal oxide semiconductor field effect transistor), IGBT (isolated gate bipolar transistor) and so on. The feedback circuit 103 is coupled to the output terminal of the switching circuit 101 and generates a feedback signal FB representative of the output voltage VOUT. The controller 102 is coupled to the switching circuit 101 and the feedback circuit 103, and generates a control signal CTRL based on the feedback signal FB to control the ON and OFF switching of the at least switch.

The controller 102 comprises an error amplifying circuit 104, a logic circuit 105, a ramp signal generator 106 and a pulse skipping circuit 107. The error amplifying circuit 104 is coupled to the feedback circuit 103, and compares the feedback signal FB with a reference signal REF to generate a compensation signal COMP. When the switching circuit 101 is configured in a flyback converter, the feedback circuit 103 and the error amplifying circuit 104 may be realized by a resistor, a three-terminal shunt regulator TR and an optical coupler.

The logic circuit 105 is coupled to the switching circuit 101 and the error amplifying circuit 104, and generates the control signal CTRL based on the compensation signal COMP. The control signal CTRL comprises numerous periodical switching pulses. The logic circuit 105 may use any known control method, such as quasi-resonant control, fixed frequency PWM control, off time control and so on. The ramp signal generator 106 is configured to generate a ramp signal RAMP. The pulse skipping circuit 107 is coupled to the error amplifying circuit 104 and the ramp signal generator 106, and generates a pulse skipping signal SLEEP based on the compensation signal COMP, the ramp signal RAMP and a threshold voltage VTH. The logic circuit 105 receives the pulse skipping signal SLEEP, and skips one or more switching pulses of the control signal CTRL in accordance with the pulse skipping signal SLEEP.

The ramp signal RAMP may be a sawtooth signal or a triangular signal. In one embodiment, the ramp signal RAMP is a triangular signal which is increased or decreased in accordance with the polarity of the control signal CTRL. In one embodiment, the triangular signal is increased when the control signal CTRL is high and decreased when the control signal CTRL is low. In one embodiment, the ramp signal generator 106 comprises a resistor capacitor network. The input terminal of resistor capacitor network is coupled to the output terminal of the logic circuit 105 to receive the control signal CTRL, the output terminal is coupled to the pulse skipping circuit 107 to provide the ramp signal RAMP.

In one embodiment, the pulse skipping circuit 107 compares a sum of the threshold voltage VTH and the ramp signal RAMP with the compensation signal COMP, and generates the pulse skipping signal SLEEP based on the comparison result. In another embodiment, the pulse skipping circuit 107 compares the threshold voltage VTH with the difference between the compensation signal COMP and the ramp signal RAMP.

Figure 2:
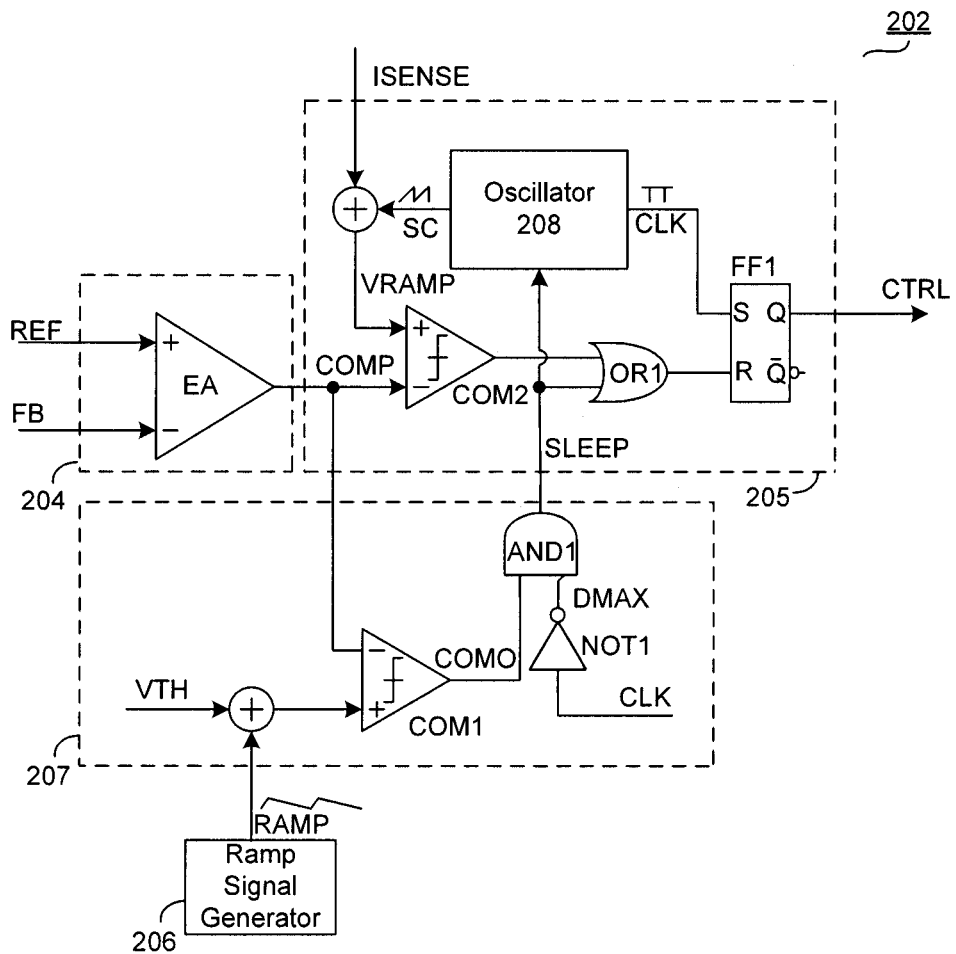
FIG. 2 illustrates a controller 202 in accordance with one embodiment of the present disclosure.

FIG. 2 illustrates a controller 202 in accordance with one embodiment of the present disclosure. The controller 202 comprises an error amplifying circuit 204, a logic circuit 205, a ramp signal generator 206 and a pulse skipping circuit 207. The error amplifying circuit 204 comprises an error amplifier EA. The non-inverting input terminal of the error amplifier EA is configured to receive the reference signal REF, the inverting input terminal is coupled to the feedback circuit to receive the feedback signal FB. The error amplifier EA provides the compensation signal COMP at its output terminal. The error amplifier EA may be an operational amplifier or a transconductance amplifier.

A fixed frequency peak current control method is used in the logic circuit 205. The logic circuit 205 comprises an oscillator 208, a comparator COM2, an OR gate OR1 and a flip flop FF1. The oscillator 208 generates a clock signal CLK and a slope compensation signal SC periodically. The clock signal CLK and the slope compensation signal SC have a switching period T. The non-inverting input terminal of the comparator COM2 is configured to receive a sum of the slope compensation signal SC and a current sensing signal ISENSE. The current sensing signal ISENSE is representative of a current flowing through a switch of the switching circuit. The inverting input terminal of the comparator COM2 is coupled to the output terminal of the error amplifier EA to receive the compensation signal COMP. The OR gate OR1 has a first input terminal, a second input terminal and an output terminal, wherein the first input terminal is coupled to the output terminal of the comparator COM2, the second input terminal is configured to receive the pulse skipping signal SLEEP. The flip flop FF1 has a set terminal S, a reset terminal R and an output terminal Q. The set terminal S is coupled to the oscillator 208 to receive the clock signal CLK, the reset terminal R is coupled to the output terminal of the OR gate OR1. The flip flop FF1 provides the control signal CTRL at its output terminal Q. The set terminal S is rising edge effective and the reset terminal R is high effective. The flip flop FF1 is reset dominate.

The pulse skipping circuit 207 comprises a hysteretic comparator COM1. The non-inverting input terminal of the comparator COM1 is configured to receive a sum of the threshold voltage VTH and the ramp signal RAMP, the inverting input terminal is coupled to the output terminal of the error amplifier EA to receive the compensation signal COMP. In one embodiment, the pulse skipping circuit 207 comprises two comparators and two threshold voltage. Each comparator compares a sum of the corresponding threshold voltage and the ramp signal RAMP with the compensation signal COMP.

In one embodiment, the pulse skipping circuit 207 further comprises an AND gate AND1. The AND gate AND1 has a first input terminal, a second input terminal and an output terminal, wherein the first input terminal is coupled to the output terminal of the comparator COM1, the second terminal is coupled to receive a maximum duty cycle signal DMAX, the output terminal is coupled to the logic circuit 205 to provide the pulse skipping signal SLEEP. The maximum duty cycle signal DMAX is representative of the rated maximum duty cycle of the control signal CTRL, such as 90%.

In one embodiment, the duty cycle of the clock signal CLK is set to be the rated maximum duty cycle of the control signal CTRL. The pulse skipping circuit 207 further comprises a NOT gate NOT1. The input terminal of the NOT gate NOT1 is coupled to the oscillator 208 to receive the clock signal CLK, the output terminal is coupled to the second input terminal of the AND gate AND1 to provide the maximum duty cycle signal DMAX.

In one embodiment, at the falling edge of the pulse skipping signal SLEEP, which means the compensation signal COMP becomes larger than the sum of the threshold voltage VTH and the ramp signal RAMP, the oscillator 208 is reset and generates a clock pulse to set the flip flop FF1. In one embodiment, the oscillator 208 generates clock pulses periodically when the pulse skipping signal SLEEP is low. When the pulse skipping signal SLEEP is high, the oscillator 208 is shut down and the clock signal CLK is remained low.

Figure 3:
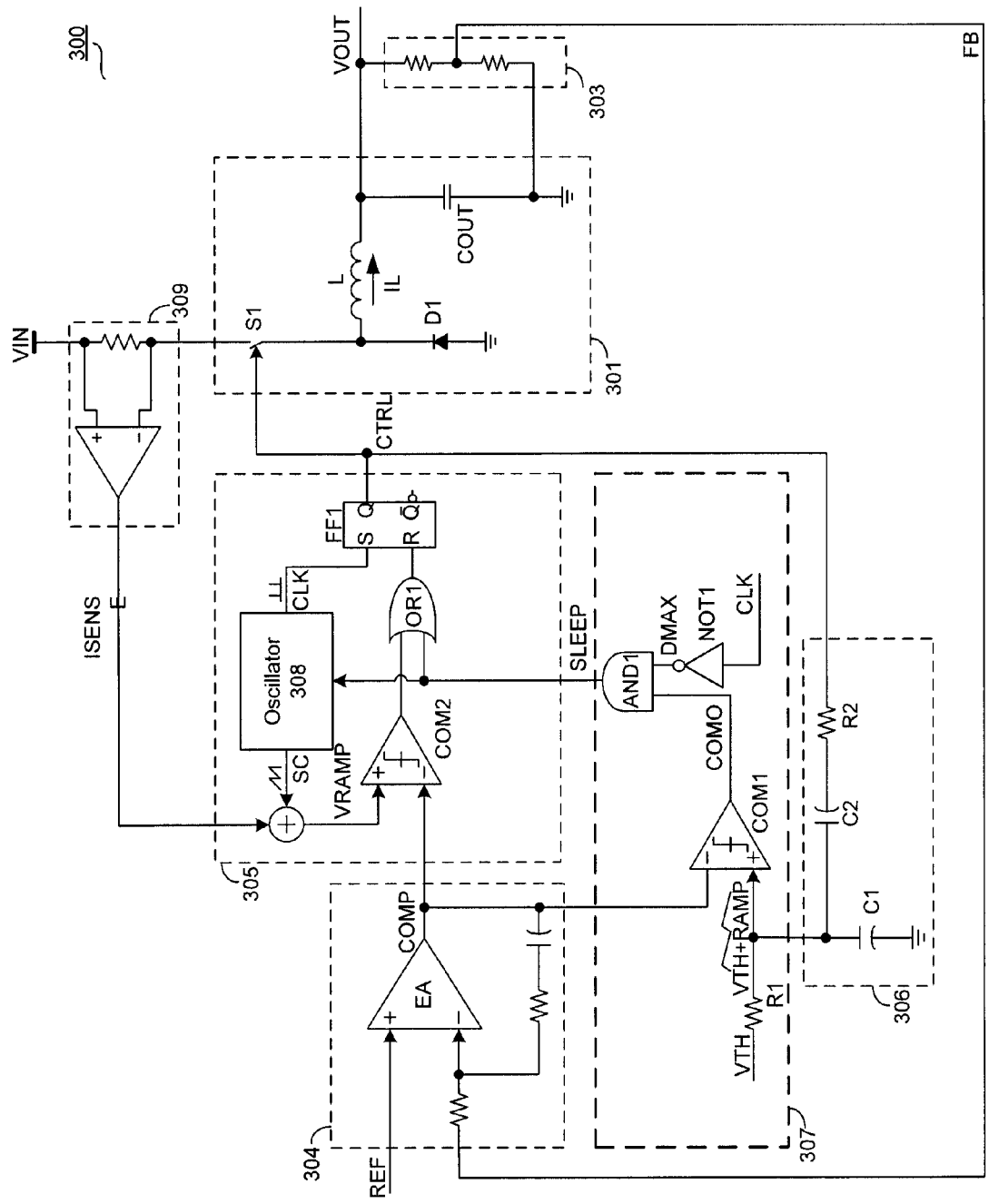
FIG. 3 illustrates a switching converter 300 in accordance with one embodiment of the present disclosure.

FIG. 3 illustrates a switching converter 300 in accordance with one embodiment of the present disclosure. The switching circuit 301 is configured in a BUCK converter and comprises a switch S1, a diode D1, an inductor L and an output capacitor COUT. The switching circuit 301 converts the input voltage VIN into the output voltage VOUT through the ON and OFF switching of the switch S1. In one embodiment, the diode D1 is replaced by a synchronous switch.

The feedback circuit 303 is coupled to the output terminal of the switching circuit 301. It senses the output voltage VOUT and generates the feedback signal FB. In one embodiment, the feedback circuit 303 comprises a resistor divider. The current sensing circuit 309 is coupled to the switch S1. It senses the current flowing through the switch S1 and generates the current sensing signal ISENSE. In one embodiment, the current sensing circuit 309 comprises a sensing resistor serially coupled to the switch S1 and a sensing amplifier coupled to the sensing resistor in parallel.

The controller comprises an error amplifying circuit 304, a logic circuit 305, a ramp signal generator 306 and a pulse skipping circuit 307. The structure of the controller is substantially same with that of the controller 202 shown in FIG. 2. The ramp signal generator 306 comprises a resistor capacitor network coupled to the output terminal of the logic circuit 305. The resistor capacitor network comprises a resistor R2 and capacitors C1, C2. The capacitor C1 is coupled between the non-inverting input terminal of the comparator COM1 and the ground. The resistor R2 has a first terminal and a second terminal, wherein the first terminal is coupled to the output terminal of the logic circuit 305 to receive the control signal CTRL. The capacitor C2 has a first terminal and a second terminal, wherein the first terminal is coupled to the second terminal of the resistor R2, the second terminal is coupled to the non-inverting input terminal of the comparator COM1. The capacitor C2 provides DC blocking so that the ramp signal RAMP will not affect the predetermined DC level of the threshold voltage VTH. The ramp signal RAMP is in phase with the current IL flowing through the inductor L. The amplitude of the ramp signal RAMP can be adjusted through changing the capacitance ratio of the capacitors C1 and C2. In one embodiment, the non-inverting input terminal of the comparator COM1 receives the threshold voltage VTH through a resistor R1.

Figure 4:
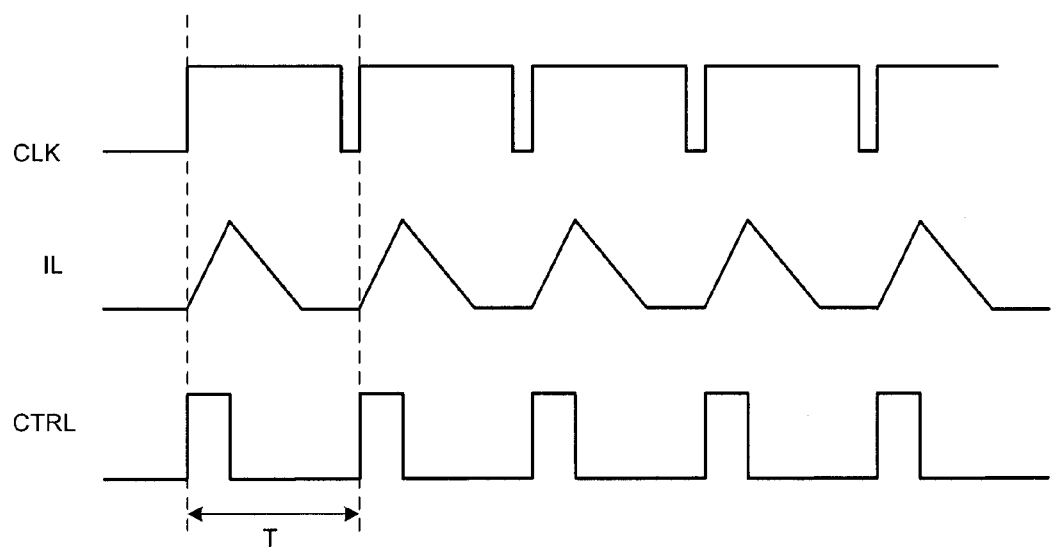
FIG. 4 and FIG. 5 are waveforms of the switching converter 300 shown in FIG. 3, in accordance with one embodiment of the present disclosure.
Figure 5:
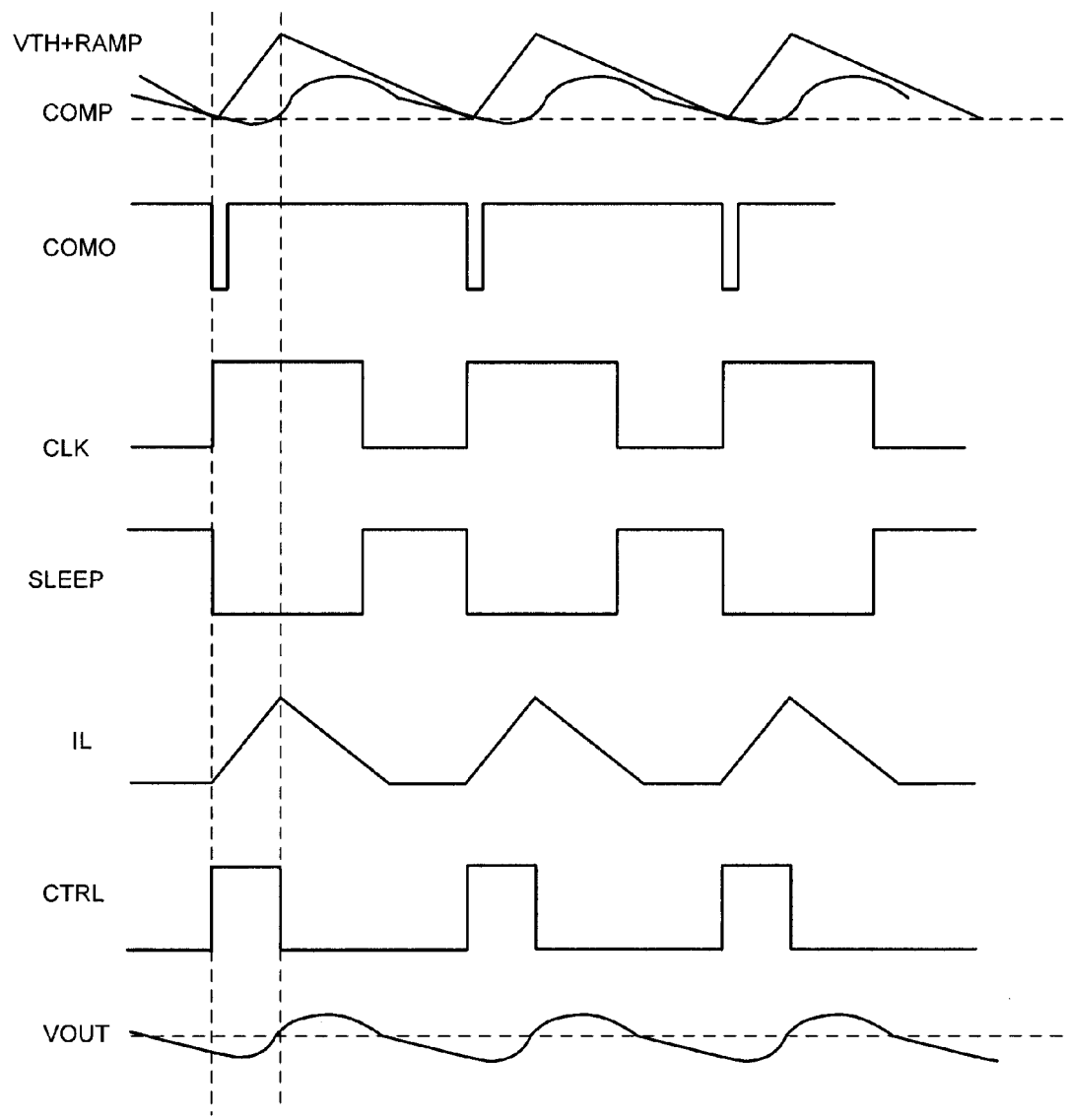

FIG. 4 and FIG. 5 are waveforms of the switching converter 300 shown in FIG. 3, in accordance with one embodiment of the present disclosure. FIG. 4 is a waveform of the switching converter 300 under normal operation. The load current is relatively large and the output voltage VOUT is on the small side. The compensation signal COMP is larger than the sum of the threshold voltage VTH and the ramp signal RAMP. The pulse skipping signal SLEEP is low, and does not affect the output signals of the oscillator 308 and the OR gate OR1.

At the rising edge of the clock signal CLK, the flip flop FF1 is set. The control signal CTRL is high and the switch S1 is turned on. The current IL flowing through the inductor L and the current sensing signal ISENSE are increased. When the sum of the current sensing signal ISENSE and the slope compensation signal SC becomes larger than the compensation signal COMP, the flip flop FF1 is reset. The control signal CTRL is low and the switch S1 is turned off. The current IL flowing through the inductor L is reduced. These steps are repeated. So the control signal CTRL comprises numerous switching pulses having the switching period T.

FIG. 5 is a waveform of the switching converter 300 under pulse skipping mode. The load current is small. When the compensation signal COMP is smaller than the sum of the threshold voltage VTH and the ramp signal RAMP, the output signal COMO of the comparator COM1 is high. This high level is provided to the oscillator 308 and the OR gate OR1 when the clock signal CLK is low. The oscillator 308 is shut down, and the control signal CTRL is maintained low. The switch S1 is turned off until the compensation signal COMP becomes larger than the sum of the threshold voltage VTH and the ramp signal RAMP.

When the compensation signal COMP is larger than the sum of the threshold voltage VTH and the ramp signal RAMP, the pulse skipping signal SLEEP as well as the output signal COMO of the comparator COM1 is changed from high to low and the oscillator 308 is reset. The flip flop FF1 is set and the control signal CTRL is high. The switch S1 is turned on. The current flowing through the switch S1 and the current sensing signal ISENSE are increased.

The ramp signal RAMP is in phase with the inductor current IL. It is increased when the control signal CTRL is high and decreased when the control signal CTRL is low. As shown in FIG. 5, the time period when the compensation signal COMP is larger than the sum of the threshold voltage VTH and the ramp signal RAMP is very short. The output signal COMO of the comparator is changed into high level soon. Since the clock signal CLK is still high then, the pulse skipping signal SLEEP is low. The output signals of the oscillator 308 and the OR gate OR1 are not affected.

When the sum of the current sensing signal ISENSE and the slope compensation signal SC becomes larger than the compensation signal COMP, the output signal of the OR gate OR1 is high. The flip flop FF1 is reset. The control signal CTRL is low and the switch S1 is turned off. The high level of the signal COMO is provided to the oscillator 308 and the OR gate OR1 when the clock signal CLK is low. The oscillator 308 is shut down, and the control signal CTRL is maintained low. The switch S1 is maintained off until the compensation signal COMP becomes larger than the sum of the threshold voltage VTH and the ramp signal RAMP. These steps are repeated. So one or more switching pulses of the control signal CTRL are skipped.

Since the time period when the compensation signal COMP is larger than the sum of the threshold voltage VTH and the ramp signal RAMP is very short, the pulse skipping signal SLEEP is high at all the time exceeding the maximum duty cycle. There is only one pulse at a time under the pulse skipping mode and the time period between two adjacent switching pulses is determined by the load. The switching loss of the switching converter 300 is reduced, and the efficiency and stability are enhanced. The ripple of the output voltage VOUT is also reduced compared with the prior art.

Figure 6:
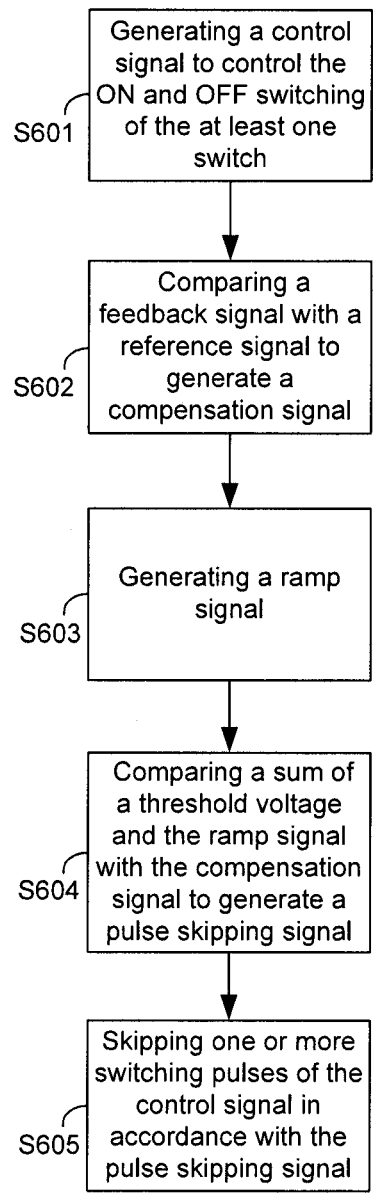
FIG. 6 is a flow chart of a control method of a switching converter, in accordance with an embodiment of the present disclosure.

FIG. 6 is a flow chart of a control method of a switching converter, in accordance with an embodiment of the present disclosure. The switching converter comprises a switching circuit having at least one switch. The switching circuit converts an input voltage into an output voltage through the ON and OFF switching of the at least one switch. The control method comprises steps S601-S605.

At step S601, a control signal is generated to control the ON and OFF switching of the at least one switch, wherein the control signal comprises numerous periodical switching pulses.

At step S602, a feedback signal representative of the output voltage of the switching circuit is compared with a reference signal to generate a compensation signal.

At step S603, a ramp signal is generated.

At step S604, a sum of a threshold voltage and the ramp signal is compared with the compensation signal to generate a pulse skipping signal. The ramp signal may be a sawtooth signal or a triangular signal. In one embodiment, the ramp signal is a triangular signal which is increased or decreased in accordance with the polarity of the control signal. In one embodiment, the ramp signal is gained from the control signal through a resistor capacitor network.

At step S605, one or more switching pulses of the control signal are skipped in accordance with the pulse skipping signal.

In one embodiment, the step of generating the control signal comprises: generating a clock signal and a slope compensation signal periodically; comparing a sum of the slope compensation signal and a current sensing signal with the compensation signal; and generating the control signal based on the clock signal and the comparison result. In one embodiment, the clock signal and the slope compensation signal is reset once the compensation signal becomes larger than the sum of the threshold voltage and the ramp signal.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

I claim:

1. A controller used in a switching converter, wherein the switching converter comprises a switching circuit having at least one switch, the controller comprises:
    an error amplifying circuit configured to generate a compensation signal based on comparing a feedback signal with a reference signal, wherein the feedback signal is representative of the output voltage of the switching circuit;
    a logic circuit coupled to the switching circuit and the error amplifying circuit, wherein based on the compensation signal, the logic circuit generates a control signal having periodical switching pulses to control the ON and OFF switching of the at least one switch;
    a ramp signal generator configured to generate a ramp signal; and
    a pulse skipping circuit coupled to the error amplifying circuit and the ramp signal generator, wherein the pulse skipping circuit generates a pulse skipping signal based on the compensation signal, the ramp signal and a threshold voltage; wherein
    the logic circuit receives the pulse skipping signal and skips one or more switching pulses of the control signal in accordance with the pulse skipping signal.

2. The controller of claim 1, wherein the pulse skipping circuit comprises a comparator having a first input terminal, a second input terminal and an output terminal, wherein the first input terminal is configured to receive a sum of the threshold voltage and the ramp signal, the second input terminal is coupled to the error amplifying circuit to receive the compensation signal.

3. The controller of claim 2, wherein the pulse skipping circuit further comprises a AND gate having a first input terminal, a second input terminal and an output terminal, wherein the first input terminal is coupled to the output terminal of the comparator, the second input terminal is coupled to receive a maximum duty cycle signal, the output terminal is coupled to the logic circuit to provide the pulse skipping signal.

4. The controller of claim 1, wherein the ramp signal is a triangular signal which is increased or decreased in accordance with the polarity of the control signal.

5. The controller of claim 1, wherein the ramp signal generator comprises a resistor capacitor network having an input terminal and an output terminal, and wherein the input terminal of the resistor capacitor network is coupled to the logic circuit to receive the control signal, and the output terminal is coupled to the pulse skipping circuit to provide the ramp signal.

6. The controller of claim 3, wherein the ramp signal generator comprises:
    a first capacitor having a first terminal and a second terminal, wherein the second terminal is grounded;
    a resistor having a first terminal and a second terminal, wherein the first terminal is coupled to the output terminal of the logic circuit to receive the control signal; and
    a second capacitor having a first terminal and a second terminal, wherein the first terminal is coupled to the second terminal of the resistor, the second terminal of the second capacitor and the first terminal of the first capacitor are coupled together and coupled to the pulse skipping circuit to provide the ramp signal.

7. A controller used in a switching converter, wherein the switching converter comprises a switching circuit having at least one switch, the controller comprises:
    an error amplifier having a first input terminal, a second input terminal and an output terminal, wherein the first input terminal is configured to receive a reference signal, the second input terminal is configured to receive a feedback signal representative of the output voltage of the switching circuit, and wherein based on the reference signal and the feedback signal, the error amplifier provides a compensation signal at the output terminal;
    an oscillator configured to generate a clock signal and a slope compensation signal periodically;
    a ramp signal generator configured to generate a ramp signal;
    a first comparator having a first input terminal, a second input terminal and an output terminal, wherein the first input terminal is configured to receive a sum of a threshold voltage and the ramp signal, the second input terminal is coupled to the output terminal of the error amplifier to receive the compensation signal;
    a NOT gate having an input terminal and an output terminal, wherein the input terminal of the NOT gate is coupled to the oscillator to receive the clock signal;
    a AND gate having a first input terminal, a second input terminal and an output terminal, wherein the first input terminal is coupled to the output terminal of the first comparator, the second input terminal is coupled to the output terminal of the NOT gate;
    a second comparator having a first input terminal, a second input terminal and an output terminal, wherein the first input terminal is configured to receive a sum of the slope compensation signal and a current sensing signal representative of a current flowing through a switch of the switching circuit, the second input terminal is coupled to the output terminal of the error amplifier to receive the compensation signal;
    a OR gate having a first input terminal, a second input terminal and an output terminal, wherein the first input terminal is coupled to the output terminal of the second comparator, the second input terminal is coupled to the output terminal of the AND gate; and
    a flip flop having a first input terminal, a second input terminal and an output terminal, wherein the first input terminal is coupled to the oscillator to receive the clock signal, the second input terminal is coupled to the output terminal of the OR gate, wherein based on the clock signal and the output signal of the OR gate, the flip flop provides a control signal to control an ON and OFF switching of the at least one switch at the output terminal.

8. The controller of claim 7, wherein the oscillator is reset once the compensation signal becomes larger than the sum of the threshold voltage and the ramp signal.

9. The controller of claim 7, wherein the ramp signal is a triangular signal which is increased or decreased in accordance with the polarity of the control signal.

10. The controller of claim 7, wherein the ramp signal generator comprises a resistor capacitor network having an input terminal and an output terminal, and wherein the input terminal of the resistor capacitor network is coupled to the output terminal of the flip flop to receive the control signal, and the output terminal is coupled to the first input terminal of the first comparator to provide the ramp signal.

11. The controller of claim 10, wherein the resistor capacitor network comprises:
    a first capacitor coupled between the first input terminal of the first comparator and the ground;
    a resistor having a first terminal and a second terminal, wherein the first terminal is coupled to the output terminal of the flip flop to receive the control signal; and
    a second capacitor having a first terminal and a second terminal, wherein the first terminal is coupled to the second terminal of the resistor, the second terminal is coupled to the first input terminal of the first comparator.

12. A control method of a switching converter, wherein the switching converter comprises a switching circuit having at least one switch, the control method comprises:
    generating a control signal to control the ON and OFF switching of the at least one switch, wherein the control signal comprises periodical switching pulses;
    comparing a feedback signal with a reference signal to generate a compensation signal, wherein the feedback signal is representative of the output voltage of the switching circuit;
    generating a ramp signal;
    comparing a sum of a threshold voltage and the ramp signal with the compensation signal to generate a pulse skipping signal; and
    skipping one or more switching pulses of the control signal in accordance with the pulse skipping signal.

13. The control method of claim 12, wherein the ramp signal is a triangular signal which is increased or decreased in accordance with the polarity of the control signal.

14. The control method of claim 12, wherein the ramp signal is gained from the control signal through a resistor capacitor network.

15. The control method of claim 12, wherein the step of generating the control signal comprises:
    generating a clock signal and a slope compensation signal periodically;
    comparing a sum of the slope compensation signal and a current sensing signal with the compensation signal; and
    generating the control signal based on the clock signal and the comparison result.

16. The control method of claim 15, wherein the clock signal and the slope compensation signal is reset once the compensation signal becomes larger than the sum of the threshold voltage and the ramp signal.

* * * * *